US012134428B2

(12) United States Patent
Williams et al.

(10) Patent No.: US 12,134,428 B2
(45) Date of Patent: *Nov. 5, 2024

(54) LIFT STEERING SYSTEMS AND METHODS

(71) Applicant: Oshkosh Corporation, Oshkosh, WI (US)

(72) Inventors: Derek Williams, Oshkosh, WI (US); Jihong Hao, Greencastle, PA (US); Prabhu Shankar, Oshkosh, WI (US); Devin Rosencrance, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/116,724

(22) Filed: Mar. 2, 2023

(65) Prior Publication Data

US 2023/0202552 A1 Jun. 29, 2023

Related U.S. Application Data

(63) Continuation of application No. 16/811,151, filed on Mar. 6, 2020, now Pat. No. 11,691,662.

(Continued)

(51) Int. Cl.
*B62D 5/04* (2006.01)
*B62D 7/18* (2006.01)
(Continued)

(52) U.S. Cl.
CPC ............. *B62D 5/0421* (2013.01); *B62D 7/18* (2013.01); *B62D 7/20* (2013.01); *B66F 11/042* (2013.01)

(58) Field of Classification Search
CPC ...... B62D 5/04; B62D 5/0421; B62D 5/0424; B62D 7/08; B62D 7/16; B62D 7/163;
(Continued)

(56) References Cited

U.S. PATENT DOCUMENTS 3,817,346 A * 6/1974 Wehmeyer ................ E04G 1/22
182/69.5
4,449,600 A 5/1984 Telfer
(Continued)

FOREIGN PATENT DOCUMENTS

CN 102935800 A 2/2013
CN 105967116 A * 9/2016 ............ B66F 11/042
(Continued)

OTHER PUBLICATIONS

Chinese Office Action issued in connection with CN Appl. Ser. No. 202080040578.3 dated Feb. 10, 2023 without English translation.
(Continued)

*Primary Examiner* — Laura Freedman
(74) *Attorney, Agent, or Firm* — Foley & Lardner LLP

(57) ABSTRACT

A steering system includes a first wheel and a second wheel laterally spaced apart from the first wheel, and a third wheel and a fourth wheel laterally spaced apart from the third wheel. The first wheel is rotatably coupled to a first knuckle and the second wheel is rotatably coupled to a second knuckle. The third wheel and the fourth wheel are both pivotally fixed in a forward-aligned orientation. The steering system includes a first tie rod having a first end pivotally coupled to the first knuckle and a second end pivotally coupled to a mechanical linkage, a second tie rod having a first end pivotally coupled to the second knuckle and a second end pivotally coupled to the mechanical linkage, and an electrical actuator coupled to the mechanical linkage. The mechanical linkage is arranged in front of the electrical actuator relative to a travel direction.

8 Claims, 17 Drawing Sheets

Related U.S. Application Data

(60) Provisional application No. 62/830,176, filed on Apr. 5, 2019.

(51) Int. Cl.
  *B62D 7/20* (2006.01)
  *B66F 11/04* (2006.01)

(58) Field of Classification Search
  CPC .. B62D 7/166; B62D 7/18; B62D 7/20; B66F 11/042; B66F 11/046; B66F 9/07568
  See application file for complete search history.

(56) References Cited

U.S. PATENT DOCUMENTS

| | | |
|---|---|---|
| 4,534,575 A | 8/1985 | Grove et al. |
| 4,566,710 A | 1/1986 | Furukawa et al. |
| 4,767,129 A | 8/1988 | Kawamoto et al. |
| 4,779,880 A | 10/1988 | Hyodo |
| 5,713,424 A | 2/1998 | Christenson |
| 5,820,150 A | 10/1998 | Archer et al. |
| 5,897,123 A | 4/1999 | Cherney et al. |
| 6,086,074 A | 7/2000 | Braun |
| 6,123,347 A | 9/2000 | Christenson |
| 6,371,227 B2 | 4/2002 | Bartlett |
| 6,691,819 B2 | 2/2004 | Menjak et al. |
| 6,868,936 B2 | 3/2005 | Shimizu et al. |
| 7,073,620 B2 | 7/2006 | Braun et al. |
| 7,172,051 B2 | 2/2007 | Nagamatsu et al. |
| 7,258,194 B2 | 8/2007 | Braun et al. |
| 7,293,626 B2 | 11/2007 | Ozsoylu et al. |
| 7,331,586 B2 | 2/2008 | Trinkner et al. |
| 8,201,656 B2 | 6/2012 | Archer et al. |
| 8,839,902 B1 | 9/2014 | Archer et al. |
| 9,238,477 B2 | 1/2016 | Ahern et al. |
| 9,302,129 B1 | 4/2016 | Betz et al. |
| 9,492,695 B2 | 11/2016 | Betz et al. |
| 9,580,960 B2 | 2/2017 | Aiken et al. |
| 9,580,962 B2 | 2/2017 | Betz et al. |
| 9,677,334 B2 | 6/2017 | Aiken et al. |
| 9,890,024 B2 | 2/2018 | Hao et al. |
| 10,221,055 B2 | 3/2019 | Hao et al. |
| 10,407,288 B2 | 9/2019 | Hao et al. |
| 10,458,182 B1 | 10/2019 | Betz et al. |
| 10,463,900 B1 | 11/2019 | Betz et al. |
| 10,532,722 B1 | 1/2020 | Betz et al. |
| 10,850,963 B2 | 12/2020 | Hackenberg et al. |
| 11,691,662 B2 * | 7/2023 | Hao .................. B66F 9/07568 180/444 |
| 2007/0273119 A1 | 11/2007 | Stoia |
| 2019/0185301 A1 | 6/2019 | Hao et al. |
| 2019/0352157 A1 | 11/2019 | Hao et al. |
| 2020/0140249 A1 | 5/2020 | Hackenberg et al. |
| 2020/0317488 A1 | 10/2020 | Bafile et al. |

FOREIGN PATENT DOCUMENTS

| | | |
|---|---|---|
| DE | 31 35 302 A1 | 5/1982 |
| DE | 19941535 A1 | 3/2001 |

OTHER PUBLICATIONS

International Search Report and Written Opinion regarding Appl. No. PCT/US2020/021341, DTD Jun. 26, 2020, 22 pps.

\* cited by examiner

LIFT STEERING SYSTEMS AND METHODS

CROSS-REFERENCE TO RELATED APPLICATION

This application is a continuation of U.S. patent application Ser. No. 16/811,151, filed on Mar. 6, 2020, which claims priority to U.S. Provisional Patent Application No. 62/830,176, filed Apr. 5, 2019, each of which is incorporated herein by reference in its entirety.

BACKGROUND

Many lift devices are designed to be mobile. Lift devices are commonly equipped with a drivetrain incorporated into a base of the lift device. The drivetrain can supply rotatable power to wheels, which in turn rotate to move the lift device. Like the work platform of the lift device, the orientation of the wheels is typically controlled using a hydraulic cylinder. The hydraulic cylinder requires the use of highly-pressurized hydraulic fluid.

SUMMARY

One exemplary embodiment relates to a steering system. The steering system includes a first wheel, a second wheel spaced apart from the first wheel, a first tie rod, a second tie rod, and an electrical actuator. The first wheel is rotatably coupled to a first knuckle, which is pivotable about a first suspension post. The second wheel is rotatably coupled to a second knuckle that is pivotable about a second suspension post. The first tie rod has a first end pivotally coupled to the first knuckle and a second end pivotally coupled to a mechanical linkage. The second tie rod has a first end pivotally coupled to the second knuckle and a second end pivotally coupled to the mechanical linkage. The electrical actuator is coupled to the mechanical linkage. Movement of the electrical actuator translates the mechanical linkage axially. Axial movmenet of the mechanical linkage pivots the first tie rod relative to the first knuckle and pivots the second tie rod relative to the second knuckle. Pivoting the first tie rod relative to the first knuckle adjusts an orientation of the first wheel relative to the first suspension post. Pivoting the second tie rod relative to the second knuckle adjusts an orientation of the second wheel relative to the second suspension post.

Another exemplary embodiment relates to a lift device. The lift device has a base, a retractable lift mechanism, a platform, and a steering system. The base has at least two rotatable and pivotable wheels. A first end of the retractable lift mechanism is coupled to the base, while the second end is coupled to and supports the platform. The steering system is positioned within an outer perimeter of the base and extends between the two pivotable wheels. The steering system includes a first knuckle, a second knuckle, a first tie rod, a second tie rod, and an electrical actuator. The first knuckle and the second knuckle are each coupled to one of the pivotable wheels. The first tie rod has a first end pivotally coupled to the first knuckle and a second end pivotally coupled to a drag link. The second tie rod has a first end pivotally coupled to the second knuckle and a second end pivotally coupled to the drag link. The electrical actuator is coupled to the drag link. Movement of the electrical actuator translates the drag link axially. Axial movement of the drag link pivots the first tie rod relative to the first knuckle and pivots the second tie rod relative to the second knuckle, which adjusts the orientation of the pivotable wheels. The retractable lift mechanism can be a scissor lift or a boom lift, for example.

Another exemplary embodiment relates to a scissor lift. The scissor lift includes a base, a retractable lift mechanism, a platform, and a steering system. The base has two front wheels and two rear wheels. The retractable lift mechanism has a first end coupled to the base and has a linear actuator to transition the retractable lift mechanism between a stowed position and a deployed position. The platform is coupled to and supported by a second end of the retractable lift mechanism. The steering system extends between the two front wheels, and includes a first knuckle, a second knuckle, a first tie rod, a second tie rod, and an electrical linear actuator. The first knuckle and second knuckle are each coupled to one of the front wheels. The first tie rod has a first end pivotally coupled to the first knuckle and a second end pivotally coupled to a drag link. The second tie rod has a first end pivotally coupled to the second knuckle and a second end pivotally coupled to the drag link. The electrical linear actuator is coupled to the drag link. Movement of the electrical linear actuator along a first axis translates the drag link along a second axis parallel to the first axis. Movement of the drag link along the second axis pivots the first tie rod relative to the first knuckle and pivots the second tie rod relative to the second knuckle, which adjusts an orientation of the two front wheels relative to the base.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the figures generally, the various exemplary embodiments disclosed herein relate to systems, apparatuses, and methods for steering a lift device, such as a scissor lift or a boom lift. The steering systems incorporate an electric linear actuator and drag link that are movable along parallel axes to steer the wheels of lift device. The steering systems overcome cross-directional loading limitations normally associated with linear actuators by isolating the linear actuator from other components within the steering system during operation. Isolating the linear actuator from the remaining components within the steering system prevents the linear actuator from experiencing unwanted and potentially damaging non-linear loading. Using the steering system of the present disclosure, an electric linear actuator can sufficiently replace the hydraulic cylinder normally present within the steering system of the lift device. Removing the hydraulic cylinder at least partially eliminates the need for pressurized hydraulic fluids onboard the lift device, which may be subject to leaking and difficult to service. In embodiments incorporating an electric lift actuator, leak-prone hydraulic fluids can be entirely eliminated from the lift device to produce a fully-electric lift device.

Figure 1A:
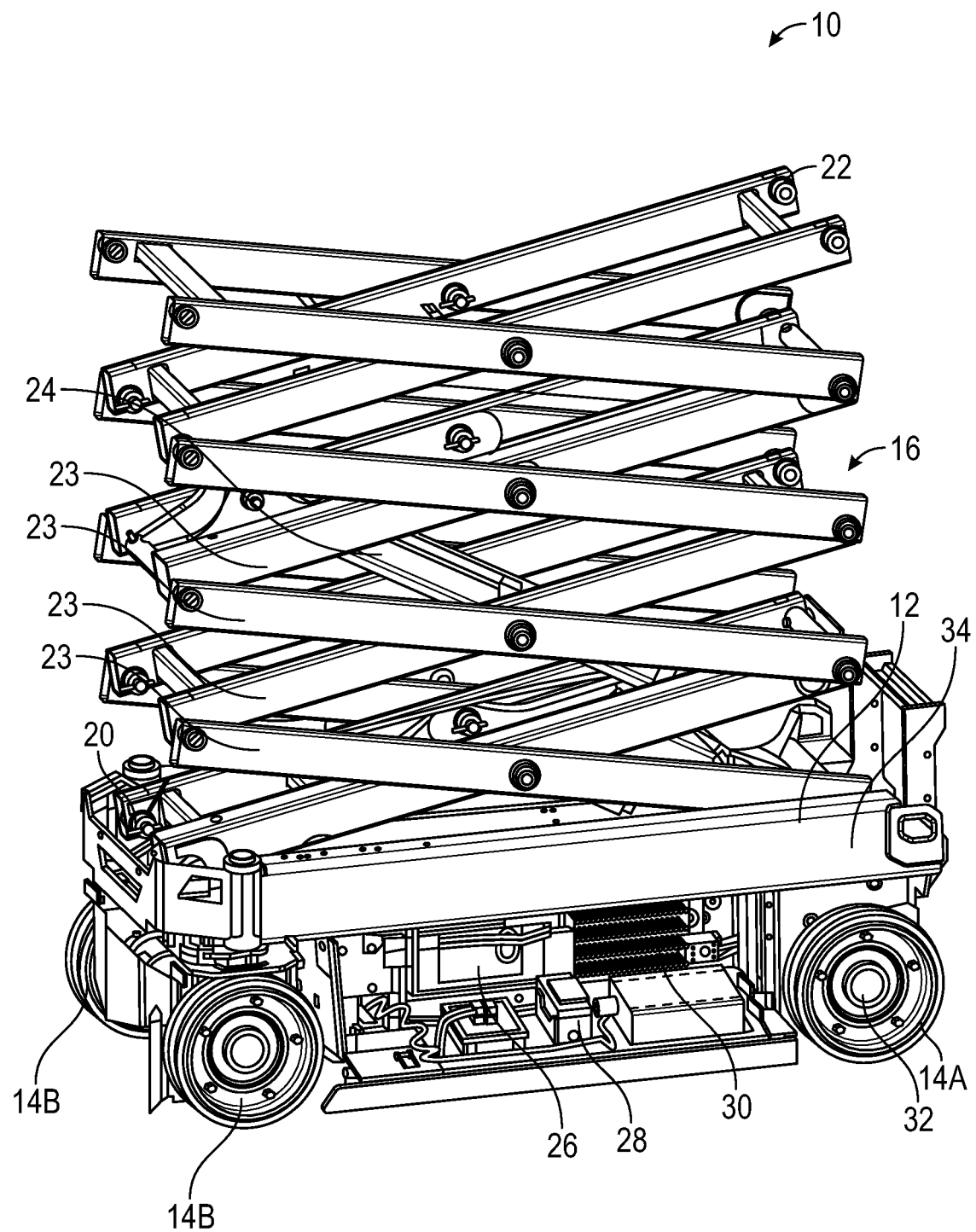
FIG. 1A is a side perspective view of a lift device in the form of a scissor lift, according to an exemplary embodiment.
Figure 1B:
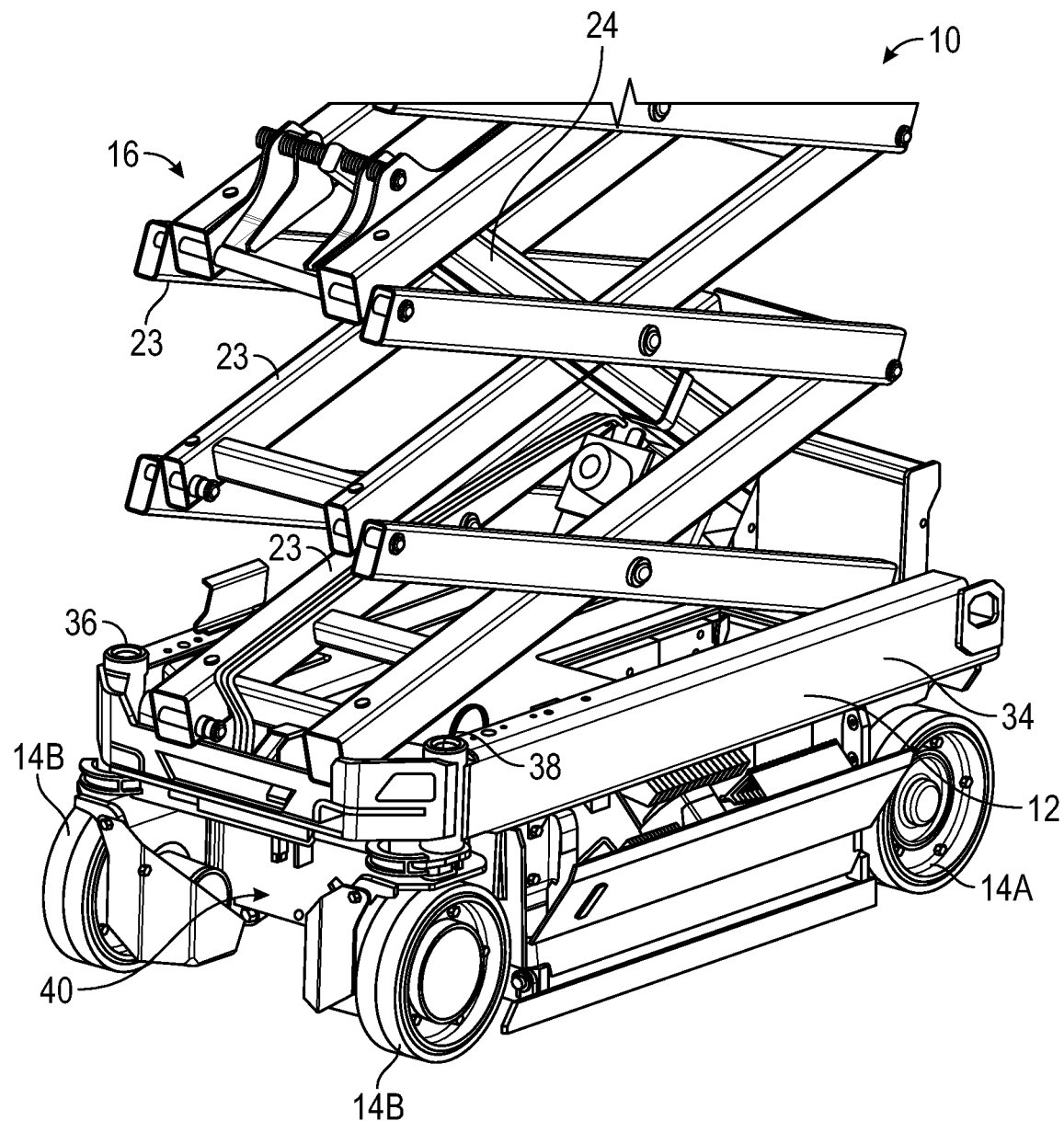
FIG. 1B is another side perspective view of the scissor lift of FIG. 1A.
Figure 3:
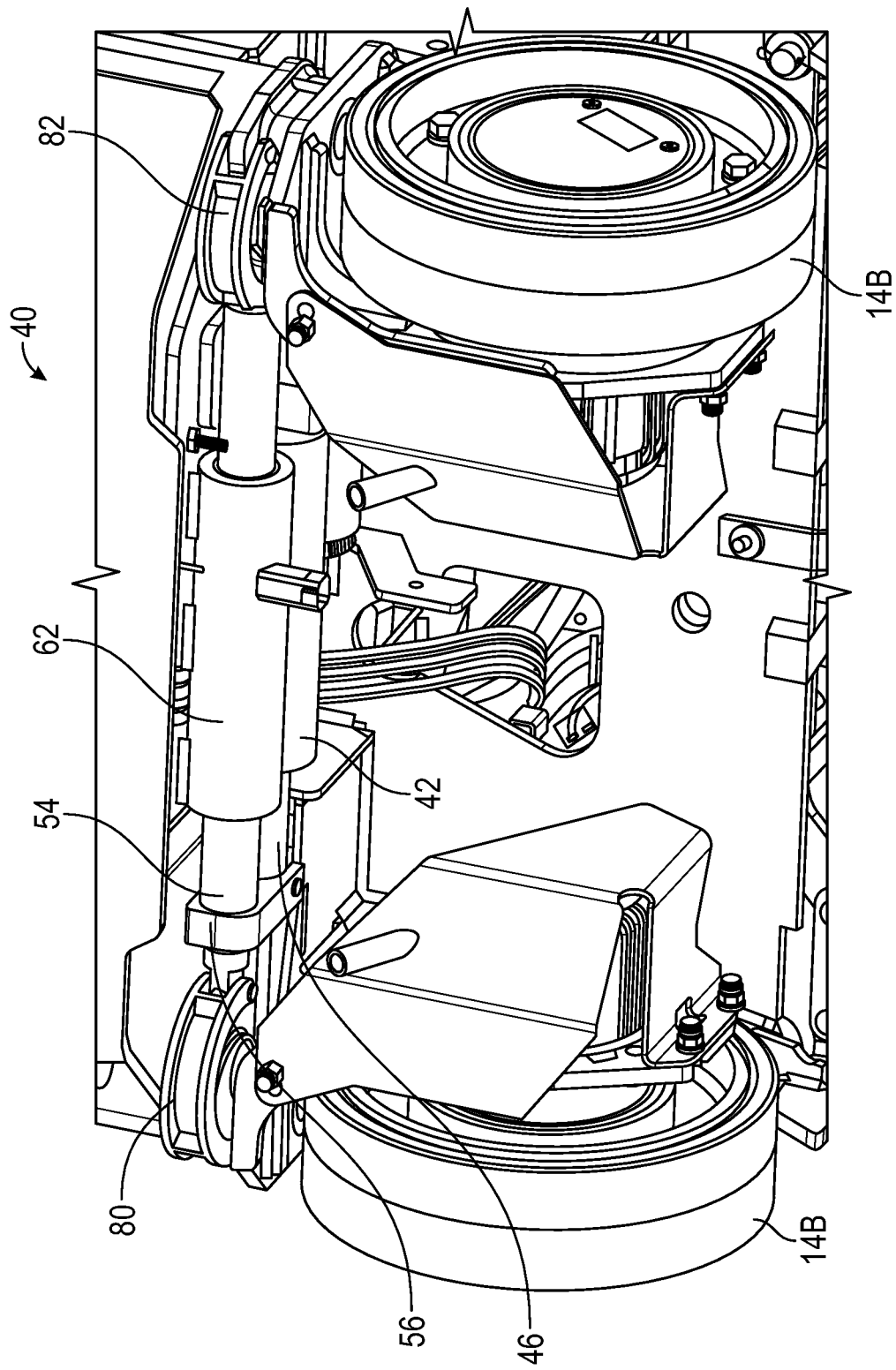
FIG. 3 is a bottom perspective view of the steering system of FIG. 1B.
Figure 16:
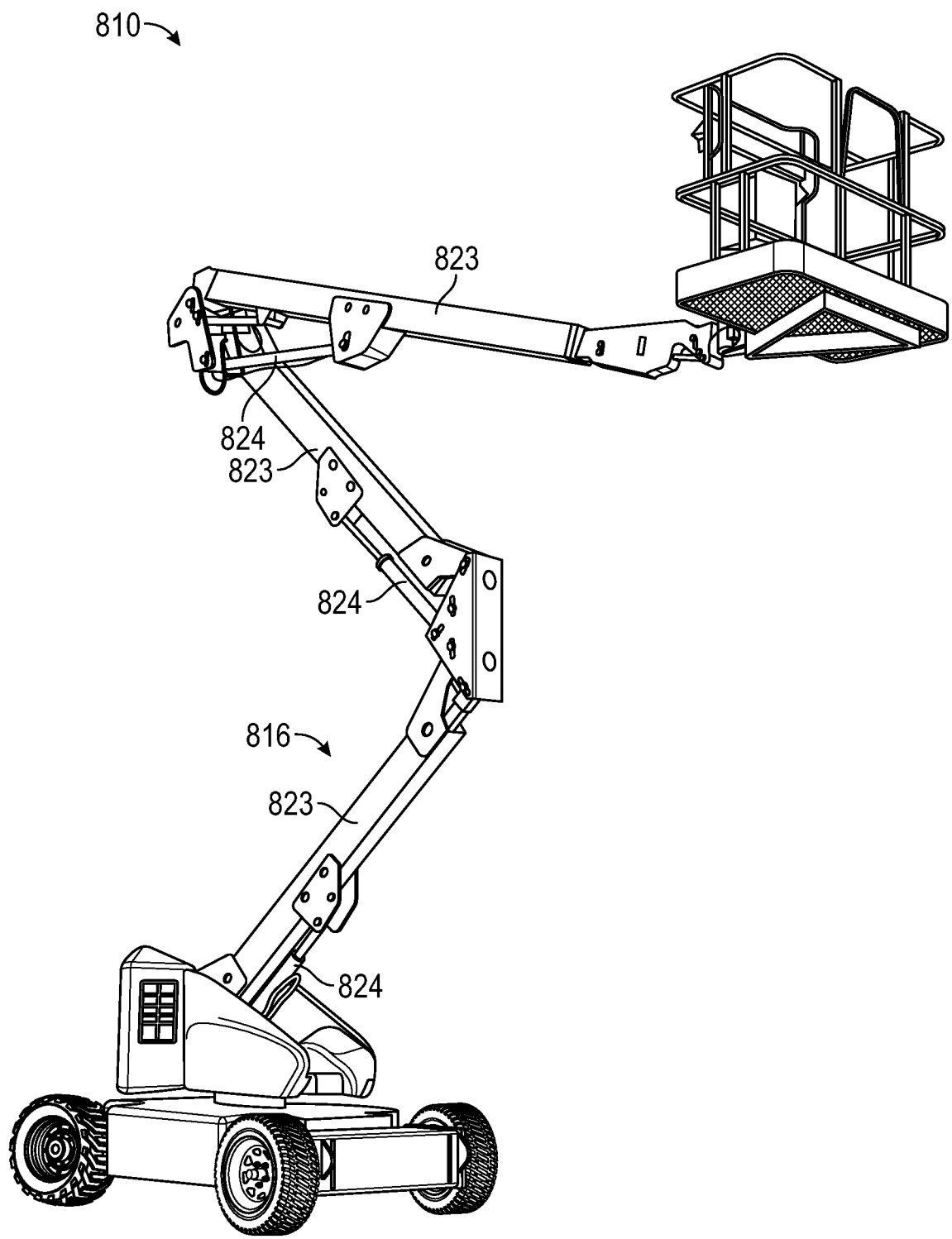
FIG. 16 is a side perspective view of another lift device in the form of a boom lift, according to another exemplary embodiment.

Referring now to FIGS. 1A and 1B, a lift device 10 is shown. The lift device 10 can take the form of a vehicle that can transport a user and a mobile elevating work platform (MEWP) simultaneously. The lift device 10 can be a scissor lift or boom lift (e.g., boom lift 810, shown in FIG. 16), for example, which can be used to perform a variety of different tasks at various elevations. The lift device 10 includes a base 12 supported by wheels 14A, 14B positioned about the base 12. A retractable lift mechanism, shown as a scissor lift mechanism 16, is coupled to the base 12 and supports a work platform 18. As depicted in FIG. 3, a first end 20 of the scissor lift mechanism 16 is anchored to the base 12, while a second end 22 of the scissor lift mechanism 16 supports the work platform 18.

In some embodiments, the scissor lift mechanism 16 is formed of a series of linked, foldable support members 23. The scissor lift mechanism 16 is selectively movable between a retracted, or stowed position and a deployed, or work position using an actuator 24. The actuator 24 can be an electric linear actuator, for example. The actuator 24 controls the orientation of the scissor lifting mechanism 16 by selectively applying force to the scissor lifting mechanism 16. When a sufficient force is applied to the scissor lifting mechanism 16 by the actuator 24, the scissor lifting mechanism 16 unfolds or otherwise deploys from the stowed, rest position. Because the work platform 18 is coupled to the scissor lifting mechanism 16, the work platform 18 is also raised away from the base 12 in response to the deployment of the lifting mechanism 16. Although described as being an electric linear actuator, the actuator 24 can also take the form of a hydraulic cylinder (not shown) or a pneumatic cylinder (not shown).

Figure 2:
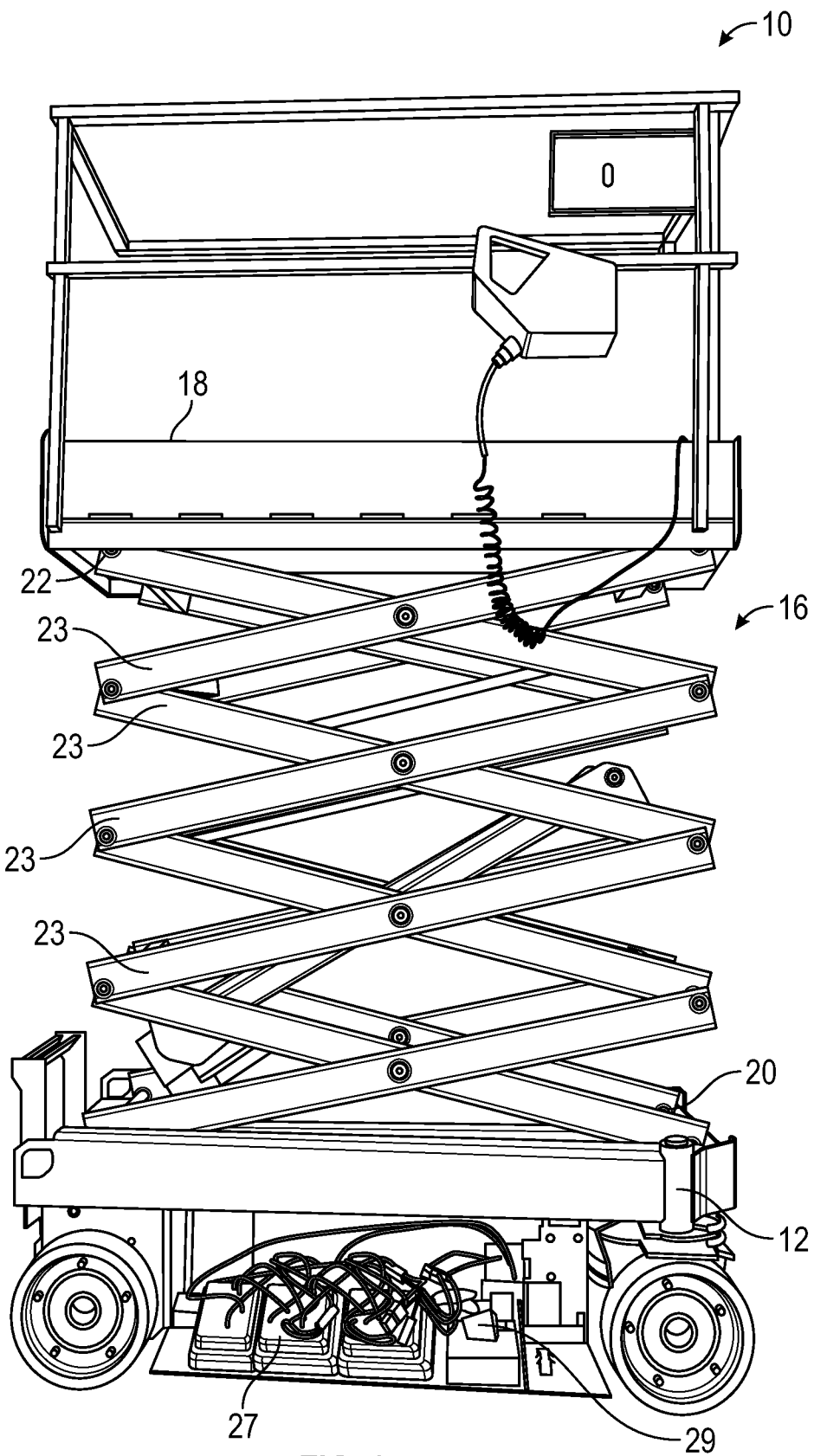
FIG. 2 is a rear view of the scissor lift of FIG. 1A, depicting various vehicle controllers.

A battery 26 can be positioned onboard the base 12 of the lift device 10 to supply electrical power to various operating systems present on the lift device 10. The battery 26 can be a rechargeable lithium-ion battery, for example, which is capable of supplying a direct current (DC) or alternating current (AC) to lift device 10 controls, motors, actuators (e.g., actuator 24), and the like. The battery 26 can include at least one input 28 capable of receiving electrical current to recharge the battery 26. In some embodiments, the input 28 is a port capable of receiving a plug (not shown) in electrical communication with an external power source, like a wall outlet. The battery 26 can be configured to receive and store electrical current from one of a traditional 120 V outlet, a 240 V outlet, a 480 V outlet, an electrical power generator, or another suitable electrical power source. In some embodiments, the battery 26 is in communication with a lift controller 27 (shown in FIG. 2), which may command the battery 26 to selectively supply electrical power to the actuator 24 to control the height and/or position of the work platform 18 and the scissor lift mechanism 16.

Figure 5:
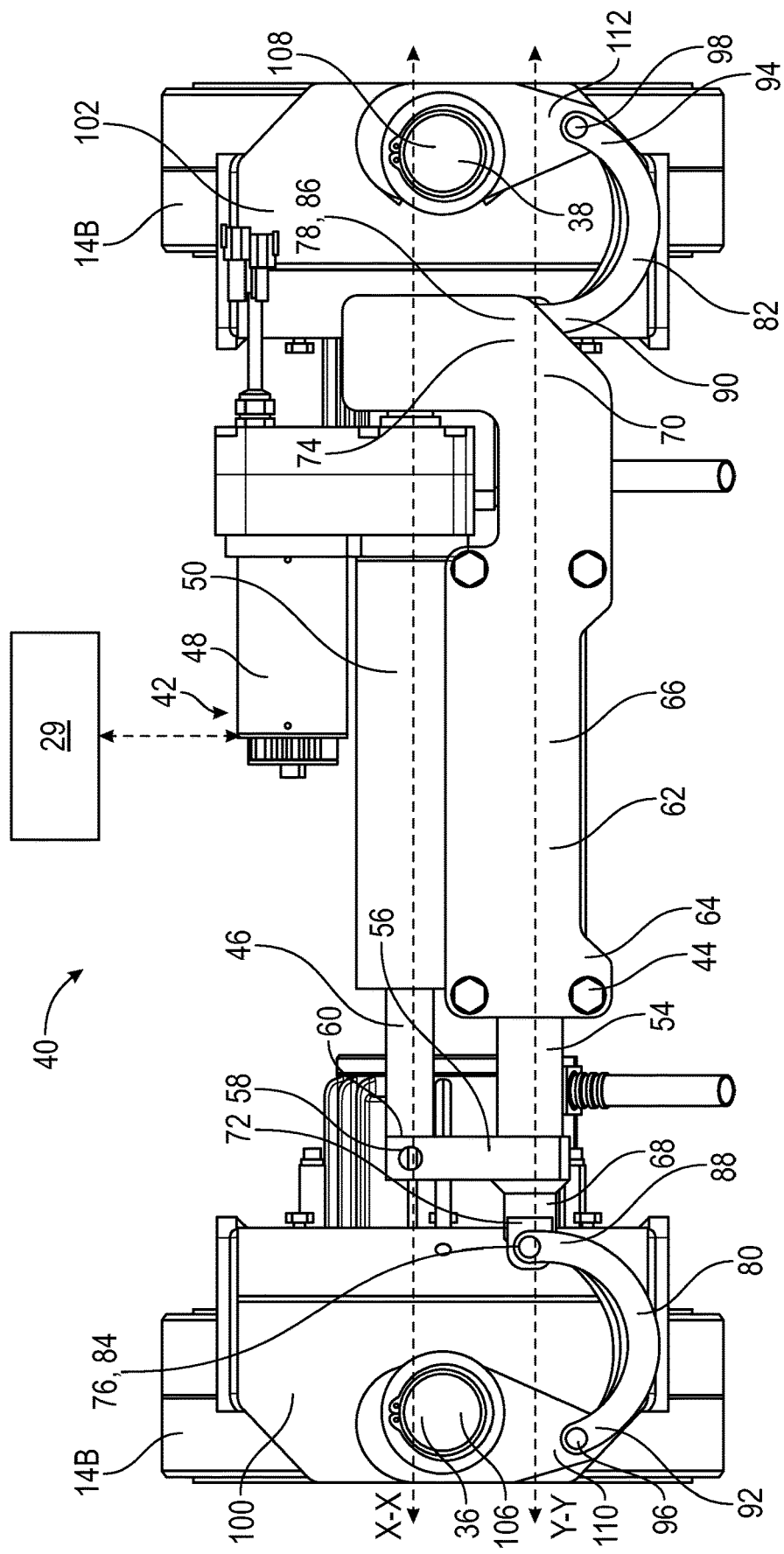
FIG. 5 is a top view of the steering system of FIG. 4.

The battery 26 can be in communication with a vehicle controller 29, as shown in FIG. 5, which selectively controls the supply of electrical power from the battery 26 to a motor 30 to drive the lift device 10. The motor 30 can be an AC motor (e.g., synchronous, asynchronous, etc.) or a DC motor (shunt, permanent magnet, series, etc.) for example, which receives electrical power from the battery 26 or other electricity source on board the lift device 10 and converts the electrical power into rotational energy in a drive shaft (not shown). The drive shaft can be used to drive the wheels 14A, 14B of the lift device 10 using a transmission (not shown). The transmission can receive torque from the drive shaft and subsequently transmit the received torque to a rear axle 32 of the lift device 10. Rotating the rear axle 32 also rotates the rear wheels 14A on the lift device 10, which propels the lift device 10.

The rear wheels 14A of the lift device 10 can be used to drive the lift device 10, while the front wheels 14B can be used to steer the lift device 10. In some embodiments, the rear wheels 14A are rigidly coupled to the rear axle 32, and are held in a constant orientation (e.g., approximately aligned with an outer perimeter 34) relative to the base 12 of the lift device 10. In contrast, the front wheels 14B are pivotally coupled to the base 12 of the lift device 10. The front wheels 14B can be coupled to vertical suspension posts 36, 38 that are mounted to a front of the base 12. The wheels 14B can be rotated relative to the base 12 about the vertical suspension posts 36, 38 (e.g., using wheel knuckles 100, 102) to adjust a direction of travel for the lift device 10.

Figure 4:
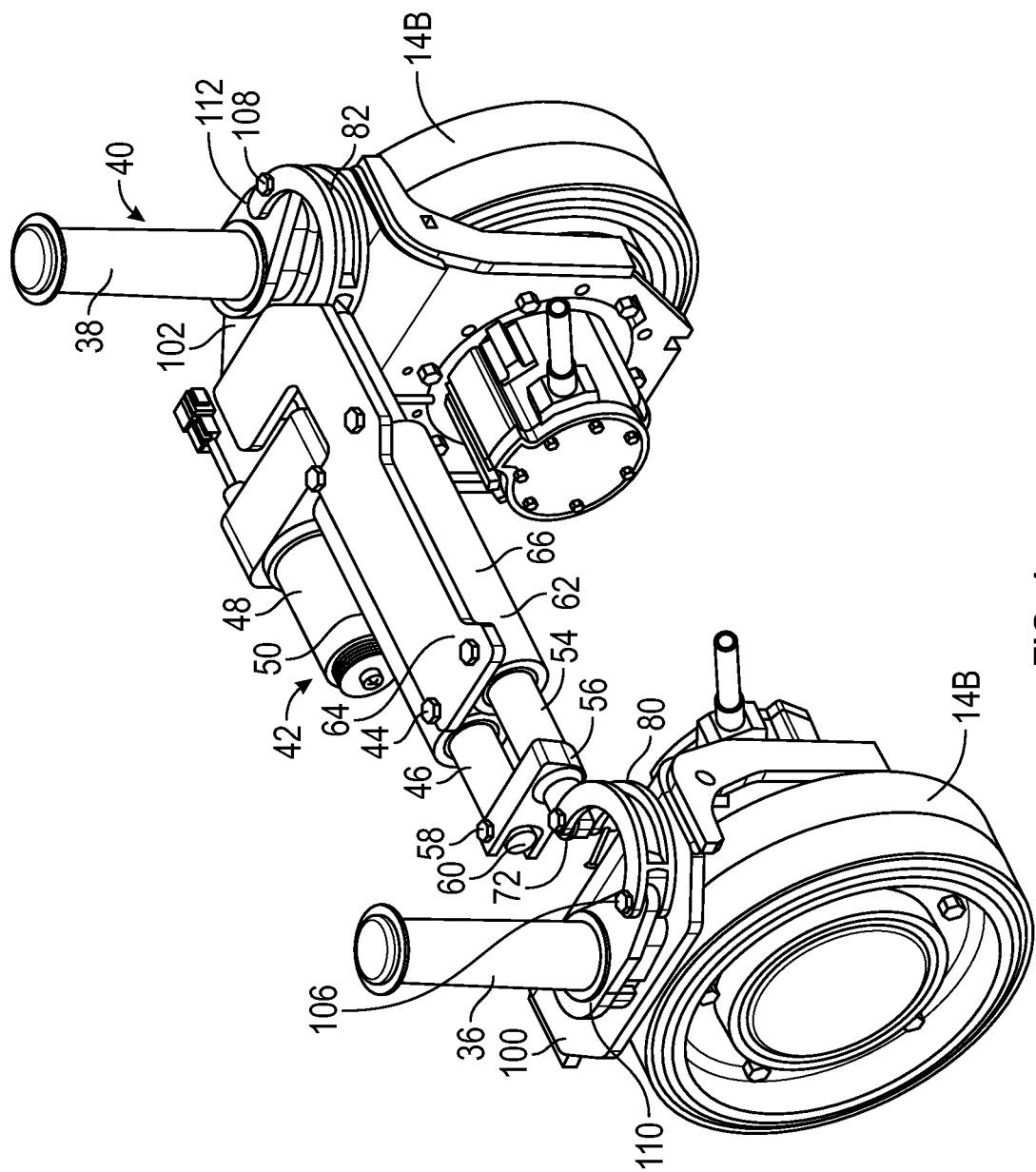
FIG. 4 is a top perspective view of the steering system of FIG. 1B, shown in isolation.

The front wheels 14B can be oriented using a steering system 40, as depicted in additional detail in FIGS. 3-5. The steering system 40 is an actively adjustable system that operates using a linear actuator 42 in lieu of a hydraulic cylinder. The steering system 40 can be mounted to the underside of the base 12 of the lift device 10, for example, and mechanically coupled to each of the two front wheels 14B (e.g., using fasteners 44). In some embodiments, the steering system 40 is completely contained within the outer perimeter 34 of the base 12 of the lift device 10. As explained in additional detail below, the linear actuator 42 can be moved to various different positions to orient the front wheels 14B of the lift device 10 in a desired direction of lift device 10 travel.

The linear actuator 42 includes a piston 46 movable about an axis X-X using a motor 48. The motor 48 can be received within a housing 50 that is coupled to an underside of the base 12 of the lift device 10. Like the motor 30, the motor 48 within the linear actuator 42 is supplied with electrical power from the battery 26. The motor 48 rotates a drive shaft (not shown) contained within the housing 50, which in turn drives a belt or gear(s). The belt or gear can be used to transmit torque from the drive shaft to a lead screw (not shown), which rotates. Rotational motion of the lead screw drives a lead screw nut (not shown) coupled to the piston 46, which translates linearly about the lead screw, along the axis X-X, as the lead screw rotates. The piston 46 can move into or out of the housing 50.

The linear actuator 42 is coupled to a mechanical linkage that rotates the front wheels 14B of the lift device 10. The mechanical linkage includes a drag link 54 that moves in concert with the piston 46 of the linear actuator 42. The drag link 54 can be an elongate bar or tube, for example, that is mounted to the piston 46 using a linkage 56. The linkage 56 can be pivotally coupled to the piston 46 and rigidly mounted to the drag link 54. In some embodiments, the linkage 56 is welded to the drag link 54 and pin-mounted to the piston 46. A pin 58 can extend through both the linkage 56 and a distal end 60 of the piston 46 to secure the linkage 56 to the piston 46.

The allowable motion of the drag link 54 can be governed by the piston 46 of the linear actuator 42, along with a bearing housing 62. The bearing housing 62 can include a mounting flange 64 and sleeve 66 extending away from the mounting flange 64. The mounting flange 64 includes a flat surface designed to sit flush upon the underside of the base 12. The mounting sleeve 66 defines a cylindrical passage through the bearing housing 62 that can receive the drag link 54. In some embodiments, the cylindrical passage is designed to form a clearance fit with the drag link 54. The bearing housing 62 can include one or more bearings (not shown) to help promote sliding movement of the drag link 54 through the sleeve 66. Alternatively, the mounting sleeve 66 of the bearing housing 62 can include a lubricant (e.g., oil) to help promote sliding motion between the drag link 54 and the mounting sleeve 66. One or more seals (not shown) can be positioned between the drag link 54 and the bearing housing 62 to avoid lubricant leakage. In some embodiments, the drag link 54 and mounting sleeve 66 are arranged so that the drag link 54 translates along a second axis Y-Y, which can be parallel to the axis X-X. The drag link 54 and mounting sleeve 66 can be approximately centered between the front wheels 14B of the lift device 10.

Each end 68, 70 of the drag link 54 can include a mounting tab 72, 74. The mounting tabs 72, 74 can each provide a generally flat surface surrounding a through hole 76, 78. The through hole 76, 78 is adapted to receive a fastener or pin, for example, which can join the drag link 54 to additional components. The mounting tabs 72, 74 can be formed integrally (i.e., continuously) with the drag link 54 or can be otherwise rigidly mounted to the drag link 54. In some embodiments, the mounting tabs 72, 74 are welded to each end 68, 70 of the drag link 54. Alternatively, through holes can be formed in the drag link 54 near each end 68, 70 of the drag link 54 so that mounting tabs 72, 74 can be omitted.

As depicted in FIGS. 3-5, the mounting tabs 72, 74 of the drag link 54 can each support a tie rod 80, 82. A first tie rod 80 is pivotally mounted to the mounting tab 72 on the first end 68 of the drag link 54, while a second tie rod 82 is pivotally mounted to the mounting tab 74 on the second end 70 of the drag link 54. Pins 84, 86 can be used to rotatably mount a first end 88, 90 of one of the tie rods 80, 82 to each end 68, 70 of the drag link 54. The tie rods 80, 82 can each be suspended below the base 12 of the lift device 10.

The second, opposite end 92, 94 of each tie rod 80, 82 can be coupled to one of the front wheels 14B of the lift device 10. Like the first end 88, 90, the second end 92, 94 of the tie rod 80, 82 can also receive a pin 96, 98 to couple the tie rods 80, 82 to the front wheels 14B. The pin coupling securely links the tie rod 80, 82 to the wheel 14B, while allowing some limited rotatable motion between the front wheel 14B and the tie rod 80, 82 it is mounted to. In some embodiments, the wheels 14B are coupled to the tie rods 80, 82 using wheel knuckles 100, 102. The wheel knuckles 100, 102 each support a front wheel 14B and are rotatably mounted to the base 12 of the lift device 10. The orientation of the wheel knuckles 100, 102 controls the orientation of the front wheels 14B and, consequently, the steering of the lift device 10. The front wheels 14B can rotate about the wheel knuckles 100, 102 to move the lift device 10.

The tie rods 80, 82 can have an arcuate shape designed to handle tensile loading. For example, each tie rod 80, 82 can be defined by a rigid, arcing member extending angularly between about 135 and 215 degrees. As depicted in FIG. 5, each tie rod 80, 82 is defined by an arc extending approximately 180 degrees between the first end 88, 90 and the second end 92, 94. The arc can be defined by a constant radius or, alternatively, a variable radius. Similarly, the tie rods 80, 82 can be defined by a uniform thickness throughout, or can vary. For example, the thickness of the tie rods 80, 82 can increase as the distance away from each of the ends 88, 90, 92, 94 increases (e.g., a point of maximum material thickness occurs near the center of each tie rod 80, 82). In some embodiments, the tie rods 80, 82 have identical sizes.

The orientation of the front wheels 14B and the steering of the lift device 10, more broadly, can be controlled using the steering system 40. As depicted in FIGS. 3-7B, the mechanical linkage formed between the linear actuator 42, the drag link 54, the tie bars 80, 82, and the wheel knuckles 100, 102 creates an Ackerman geometry steering system 40 that is controlled by the linear actuator 42. Specifically, the position of the piston 46 determines the orientation of the front wheels 14B of the lift device 10. Simultaneously, the pivotable coupling between the piston 46 and the drag link 54 partially isolates the piston 46 from the drag link 54 and ensures that only linear forces interact with the piston 46 of the linear actuator 42. The dual pin nature of the piston 46 and the drag link 54 reduces transverse loading of the piston 46.

The linear actuator 42 of the steering system 40 is in electrical communication with both the battery 26 and the vehicle controller 29. The vehicle controller 29 is configured to receive and execute steering commands. In some embodiments, the linear actuator 42 is hard wired to both the battery 26 and the vehicle controller 29. When the vehicle controller 29 receives a steering command (e.g., a desired steering orientation from a user through a steering wheel or joystick), the vehicle controller 29 can first determine the current orientation of the front wheels 14B. The current orientation of the front wheels 14B is determined by detecting (e.g., using a sensor or encoder) or otherwise knowing the current position of the piston 46 of the linear actuator 42. If the desired steering orientation does not match the current orientation of the front wheels 14B, the vehicle controller 29 can issue a command to the motor 48 of the linear actuator 42 to either retract or further advance the piston 46 relative to the housing 50. In some other embodiments, the steering system 40 and vehicle controller 29 respond to a command from a user (e.g., through a steering wheel or joystick) by adjusting the linear actuator 42 without using or needing current front wheel 14B orientation information.

Figure 6A:
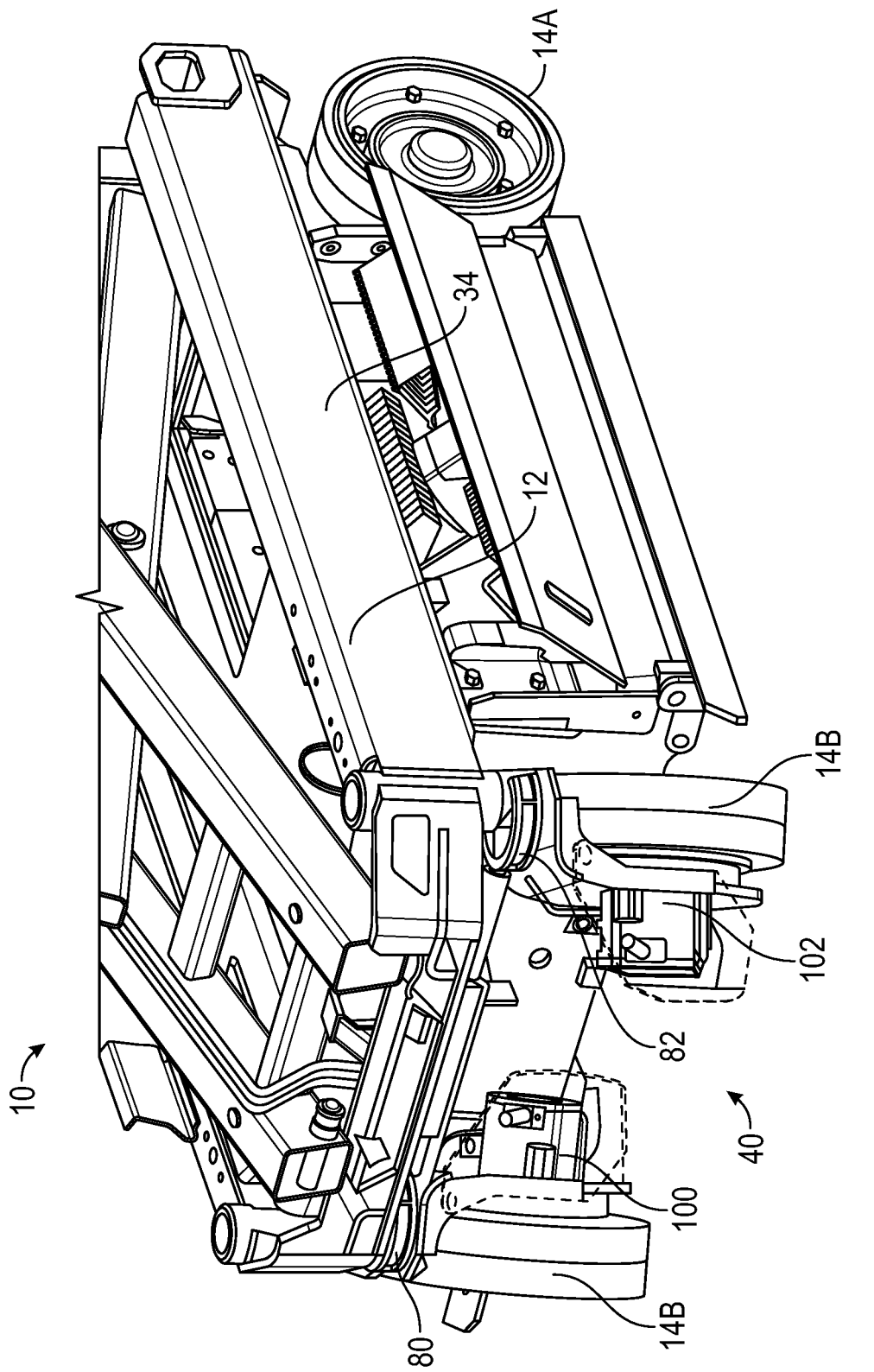
FIG. 6A is a top perspective view of the steering system of FIG. 1B, steering the lift device counterclockwise.
Figure 6B:
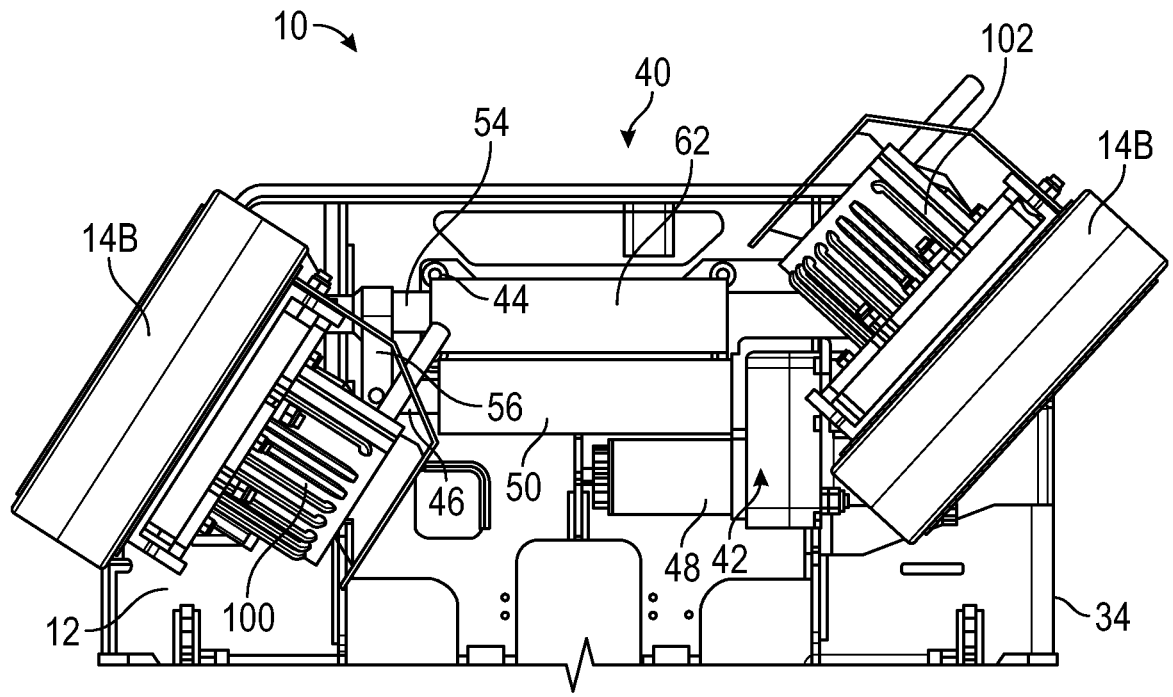
FIG. 6B is a bottom view of the steering system of FIG. 6A.

If the vehicle controller 29 receives a command to orient the front wheels 14B further counterclockwise, the motor 48 can activate to retract the piston 46 further into the housing 50. As depicted in FIGS. 6A and 6B, the piston 46 is positioned in a fully-retracted position. Because the drag link 54 is coupled to the piston 46, the drag link 54 follows the piston 46 laterally, along the second axis Y-Y. The ends 68, 70 of the drag link 54 and the tie rods 80, 82 that are coupled to the ends 68, 70 of the drag link 54 also move laterally when the drag link 54 is adjusted by the piston 46. Because the degrees of freedom in the tie rods 80, 82 are limited by the rotatable couplings on each end 88, 90, 92, 94 of the tie rod 80, 82, the wheel knuckles 100, 102 rotate when the piston 46 moves.

The rotatable coupling formed between the wheel knuckles 100, 102, the tie rods 80, 82, and the drag link 54 rotates the front wheels 14B in response to lateral movement by the drag link 54. As shown in FIG. 5, the second end 92, 94 of each tie rod 80, 82 is eccentrically coupled to a wheel knuckle 100, 102, offset from a rotation point 106, 108 for the wheel knuckle 100, 102. The tie rods 80, 82 can be pivotally coupled to a flange 110, 112 of the wheel knuckle 100, 102 that extends forward from the rotation point 106, 108 (when the front wheels 14B are oriented straight forward). Due to the eccentric mounting of the tie rods 80, 82 to the flanges 110, 112, movement of the drag link 54 transmits a tensile force within the tie rod 80 and a compressive force within the tie rod 82 that creates a torque on each wheel knuckle 100, 102 sufficient to rotate the wheel knuckles 100, 102 about their respective rotation points 106, 108. Rotation of the wheel knuckle 100, 102 about the rotation points 106, 108 rotates the front wheels 14B about the vertical suspension posts 36, 38, and changes the steering orientation of the lift device 10. Since the rear wheels 14A are fixed in a forward-aligned orientation relative to the base 12 of the lift device 10, rotating the front wheels 14B causes the vehicle to turn in the direction the front wheels 14B are pointed.

Figure 7A:
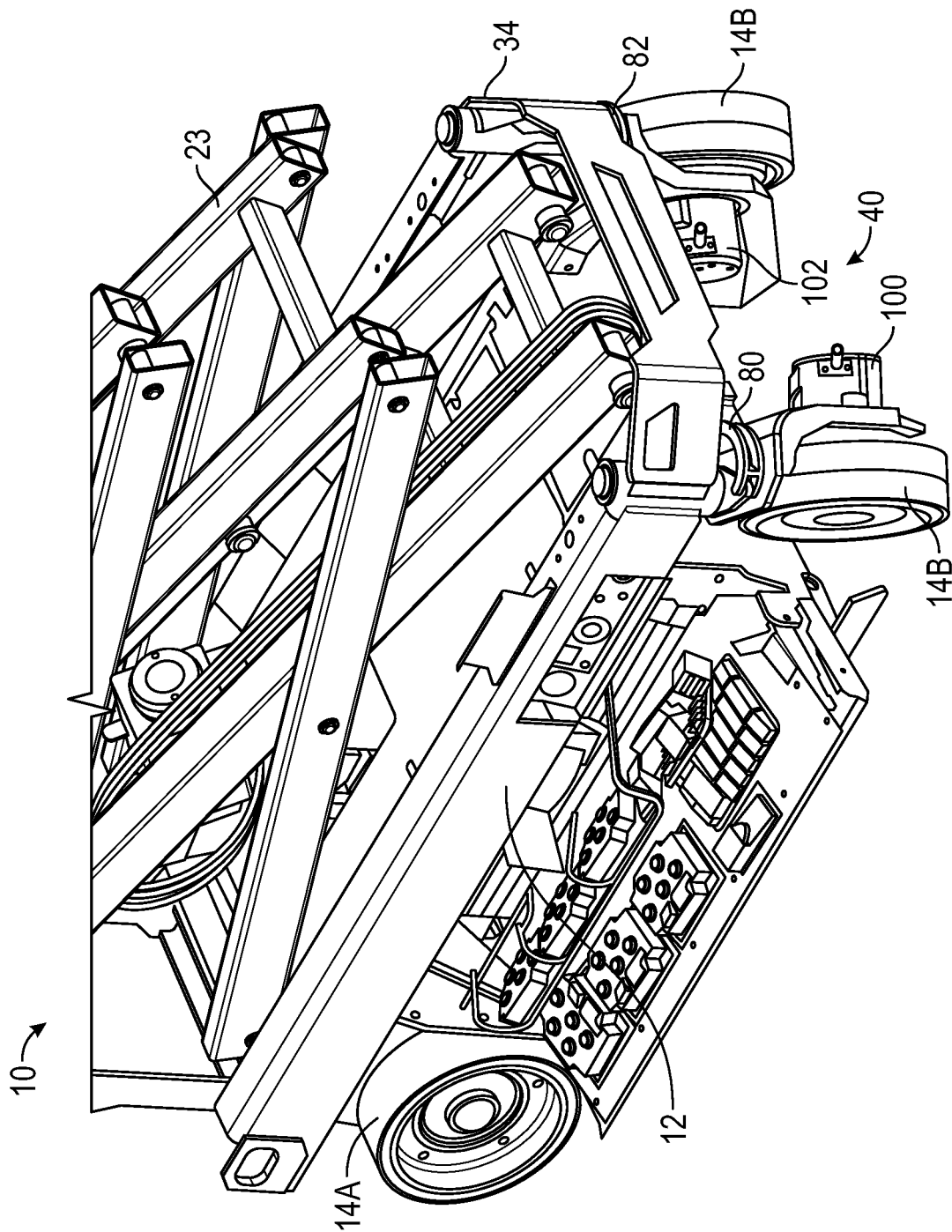
FIG. 7A is a top perspective view of the steering system of FIG. 1B, steering the vehicle clockwise.
Figure 7B:
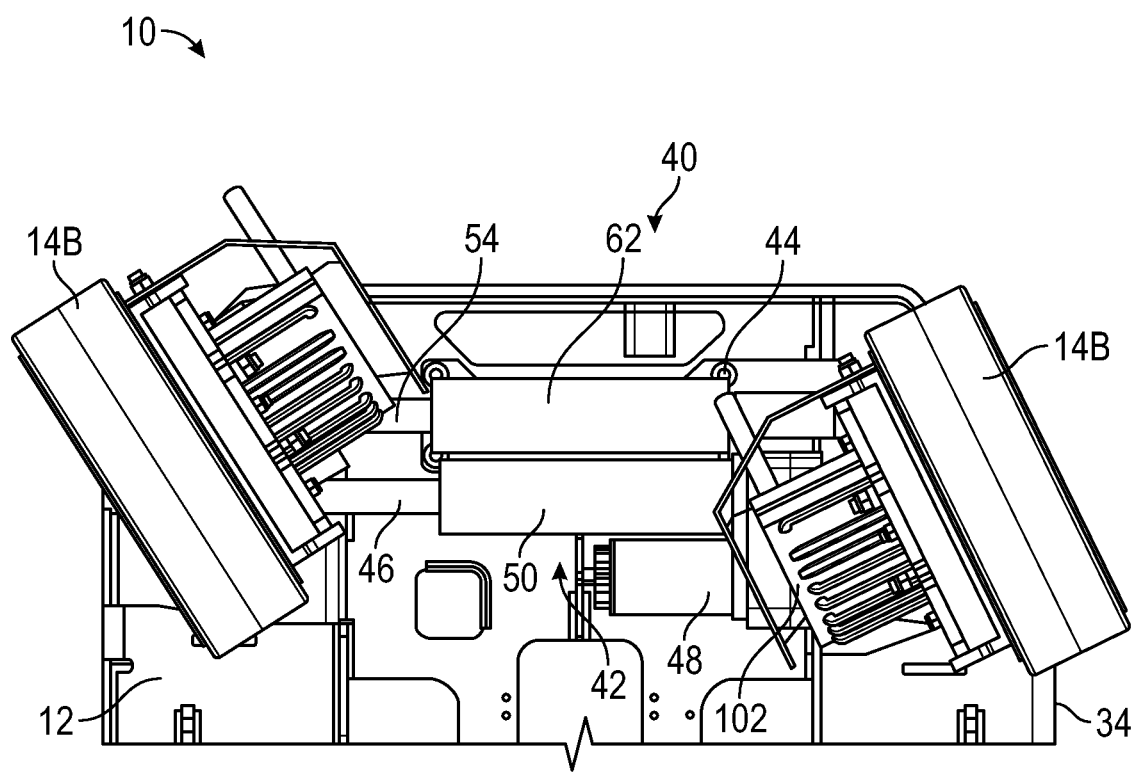
FIG. 7B is a bottom view of the steering system of FIG. 7A.

If the vehicle controller 29 instead receives a command to orient the front wheels 14B further clockwise, the motor 48 can activate to advance the piston 46 further outward from the housing 50. As depicted in FIGS. 7A and 7B, the piston 46 is positioned in a fully exposed position. As indicated above, the drag link 54 is coupled to the piston 46 and moves with the piston 46 laterally along the second axis Y-Y when the piston 46 advances along the axis X-X. The ends 68, 70 of the drag link 54 and the tie rods 80, 82 that are coupled to the ends 68, 70 of the drag link 54 also move laterally when the drag link 54 is adjusted by the piston 46.

Once again, the rotatable coupling formed between the wheel knuckles 100, 102, the tie rods 80, 82, and the drag link 54 rotates the front wheels 14B in response to lateral movement by the drag link 54. The eccentric coupling formed between the second end 92, 94 of each tie rod 80, 82 and the wheel knuckles 100, 102 pushes one wheel knuckle 100 outward (transmitting a compressive force) and pulls the other wheel knuckle 102 inward (transmitting a tensile force), toward the base 12 of the lift device 10. The front wheels 14B turn about the rotation points 106, 108 when the wheel knuckles 100, 102 rotate, which changes the steering of the lift device 10.

Various alternative component arrangements can be incorporated into the steering system 40 of the lift device 10 according to the disclosure. For example, the drag link 54 can be positioned in front of the linear actuator 42, rather than behind. Different arc lengths and shapes can be used for each tie rod 80, 82 as well. In some embodiments, the tie rods 80, 82 are linear components. In still other embodiments, the steering system 40 can be incorporated into the rear wheels 14A of the lift device 10, rather than the front wheels. Rather than a scissor lift, the lift device 10 can be an articulated boom, a telescopic boom, or other type of MEWP. The steering system 40 is compatible with and can be incorporated into nearly any type of electric vehicle. In still other embodiments, the linear actuator 42 can be replaced with a hydraulic cylinder.

Figure 8:
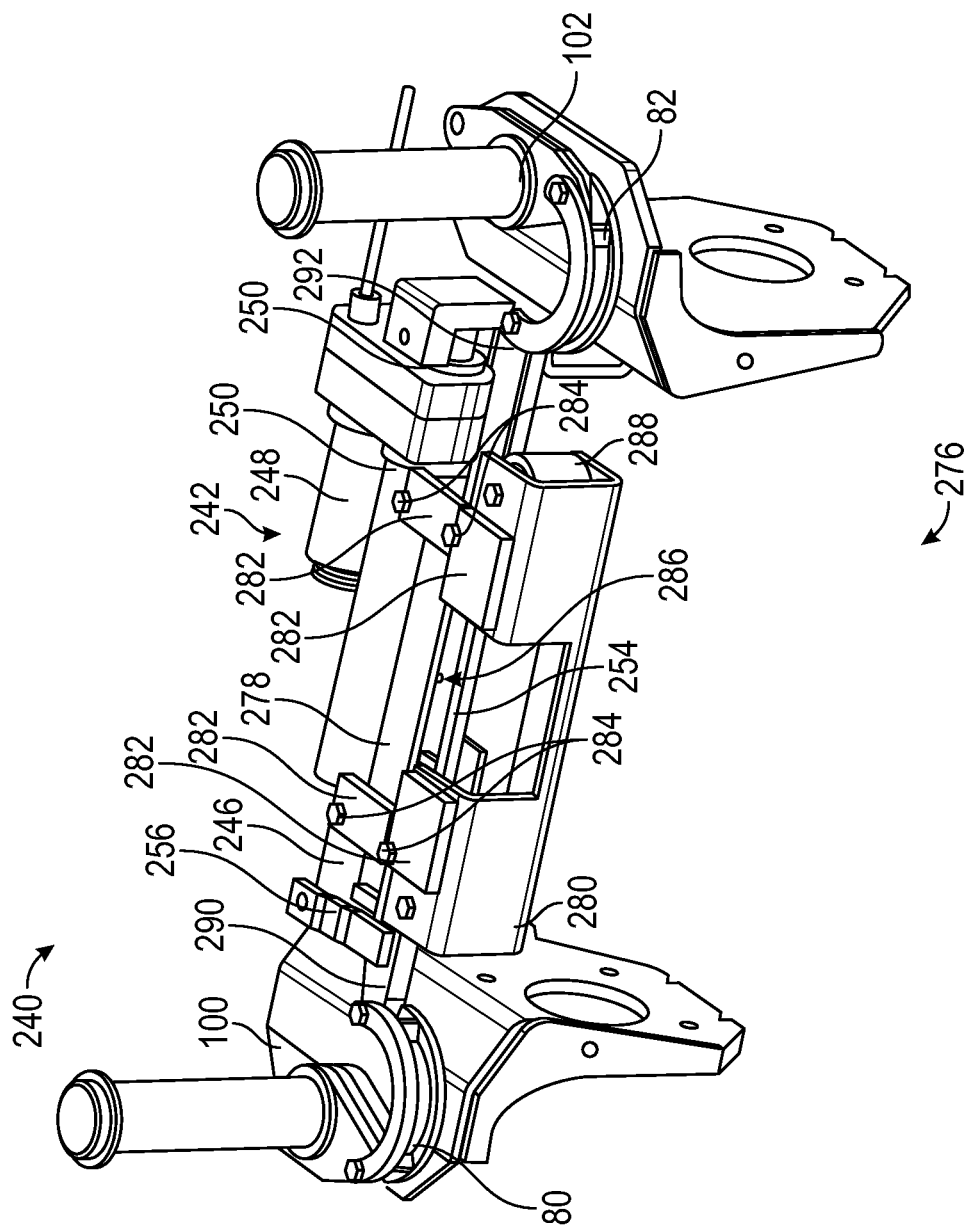
FIG. 8 is a top, front perspective view of another steering system, according to an exemplary embodiment.
Figure 9:
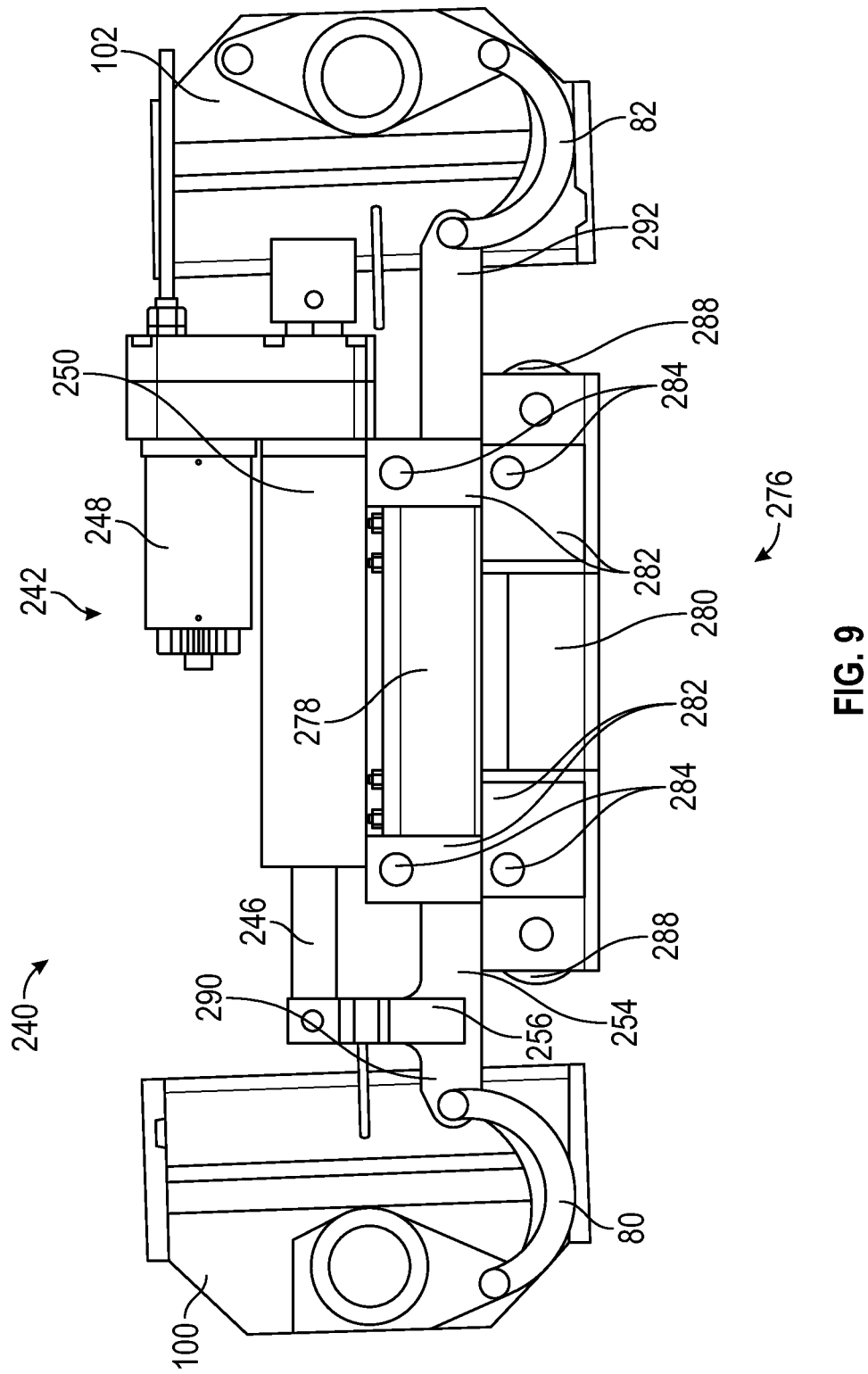
FIG. 9 is a top view of the steering system of FIG. 8.
Figure 10:
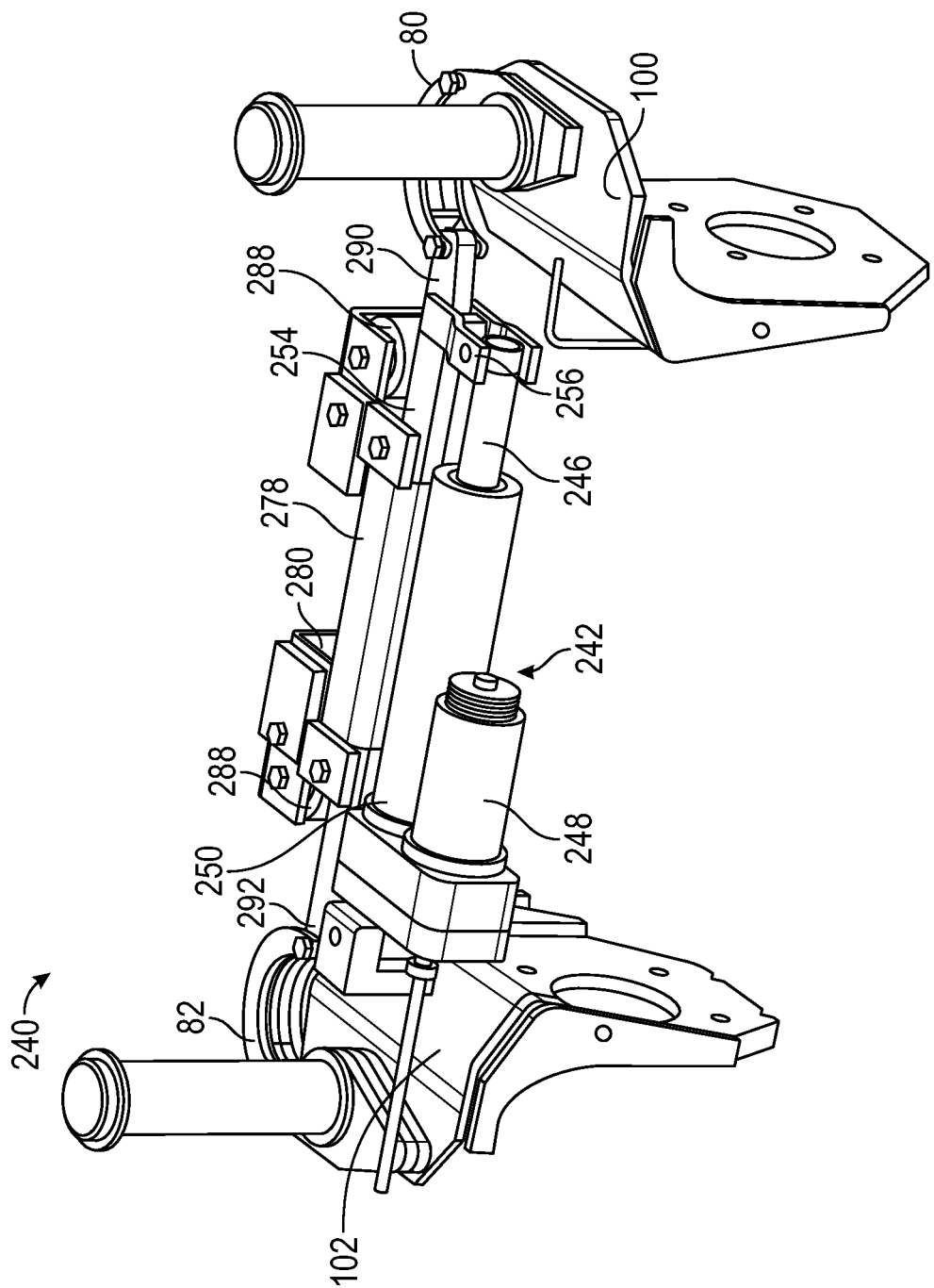
FIG. 10 is a top, rear perspective view of the steering system of FIG. 8.

Referring now to FIGS. 8-10, another exemplary embodiment of a steering system, shown as steering system 240, is depicted. Like the steering system 40, the steering system 240 is configured to orient the front wheels 14B of the lift device 10. In some embodiments, the steering system 240 may be used in place of the steering system 40, described above. The following description will focus mainly on the differences between the steering system 240 and the steering system 40. However, it will be appreciated that various aspects of the steering system 40 and/or the steering system 240 may be interchangeable. That is, in some embodiments, various aspects of the steering system 40 may be implemented into the steering system 240, and vice versa.

As illustrated, the steering system 240 similarly includes a linear actuator 242 including a piston 246 that is axially movable using a motor 248. The motor 248 functions similarly to the motor 48, and is similarly supplied with power from the battery 26 to selectively move the piston 246 into and out of a housing 250. The linear actuator 242 is similarly coupled to a drag link 254 that moves in concert with the piston 246. The piston 246 is similarly pivotally coupled to a linkage 256, which is rigidly coupled to the drag link 254, thereby effectively coupling the piston 246 to the drag link 254.

The allowable motion of the drag link 254 can be governed by the piston 246 of the linear actuator 242 along with a roller housing 276. The roller housing 276 includes a guide component 278 and a roller component 280. The guide component 278 is rigidly coupled to the roller component 280 using various connection links 282 and fasteners 284. The guide component 278 includes a guide channel 286 (shown in FIG. 8) configured to slidably receive the drag link 254. In some embodiments, the guide channel 286 may have interior bearings (not shown) to help promote sliding motion of the drag link 254 through the guide channel 286. In some other embodiments, the guide channel 286 may include a lubricant (e.g., oil) to help promote the sliding motion of the drag link 254 through the guide channel 286.

The roller component 280 includes a pair of rollers 288 disposed at opposite axial ends of the roller component 280. The pair of rollers 288 are configured to engage a lateral side of the drag link 254, opposite the guide channel 286. In some embodiments, the pair of rollers 288 comprise a high-strength plastic material. For example, the pair of rollers 288 may comprise ultra-high-molecular-weight polyethylene (UHMW). The pair of rollers 288 can comprise various other materials as well, which can be selected based the intended application. The pair of rollers 288 may be configured to act as both a stabilizer for the drag link 254 during use, and also as a shock absorber to further isolate the piston 246 from transverse forces.

As such, the drag link 254 is slidably received within the roller housing 276, between the guide component 278 and the roller component 280, and is configured to slide axially within the roller housing 276. Each end 290, 292 of the drag link 254 similarly supports and is pivotally coupled to a corresponding one of the tie rods 80, 82. Accordingly, the orientation of the front wheels 14B and the steering of the lift device 10, more broadly, can be controlled using the steering system 240 in a near identical manner to that described above, with reference to the steering system 40.

In addition to the pair of rollers 288, various components of the steering system 240 may comprise a high-strength plastic material. For example, in some embodiments, similar to the pair of rollers 288, various components of the steering system 240 may comprise UHMW. In some other embodiments, various components of the steering system 240 may comprise metallic materials.

Figure 11:
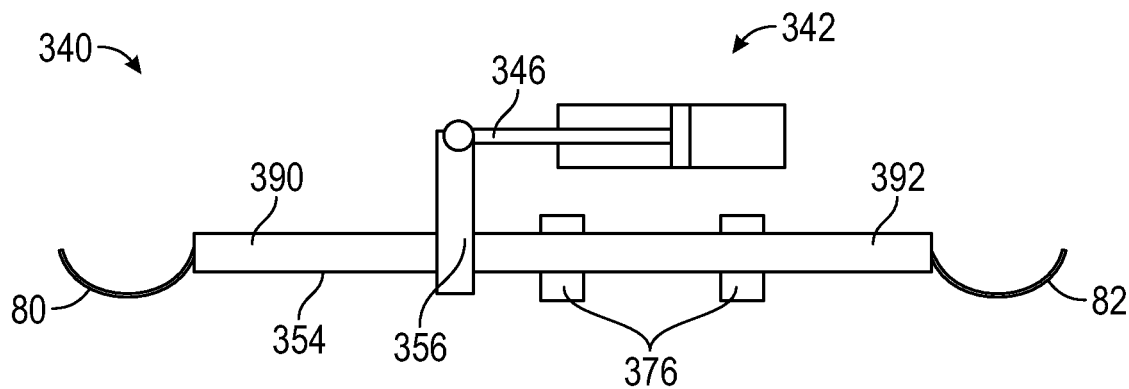
FIG. 11 is a schematic illustration of another steering system, according to an exemplary embodiment.

Referring now to FIG. 11, another exemplary embodiment of a steering system, shown as steering system 340, is depicted. Like the steering systems 40, 240, the steering system 340 is configured to orient the front wheels 14B of the lift device 10. In some embodiments, the steering system 340 may be used in place of the steering systems 40, 240 described above. The following description will focus mainly on the differences between the steering system 340 and the steering systems 40, 240.

The steering system 340 similarly includes a linear actuator 342 configured to selectively actuate a piston 346. The piston 346 is similarly pivotally coupled to a linkage 356, which is rigidly coupled to a drag link 354. The drag link 354 is slidably received within a pair of linear bearings 376. The linear bearings 376 are configured to allow the drag link 354 to slide axially, in a direction substantially parallel to the axial direction of the piston 346. Each end 390, 392 may be similarly pivotally coupled to a corresponding one of the tie rods 80, 82. As such, the orientation of the front wheels 14B and the steering of the lift device 10, more broadly, can be controlled using the steering system 340 in a near identical manner to that described above, with reference to the steering systems 40, 240. Again, the pivotal coupling between the piston 346 and the linkage 356 may allow for the piston 346 to be at least partially isolated from undesirable transverse loading.

Figure 12:
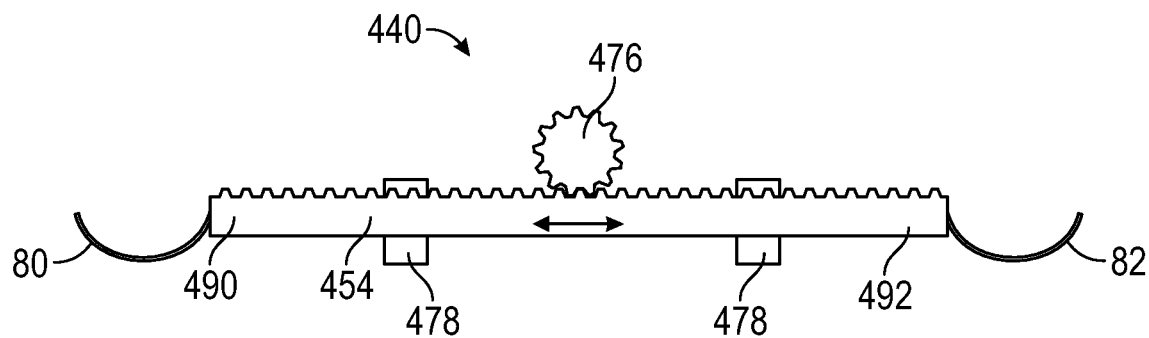
FIG. 12 is a schematic illustration of another steering system, according to an exemplary embodiment.

Referring now to FIG. 12, another exemplary embodiment of a steering system, shown as steering system 440, is depicted. Like the steering systems 40, 240, 340, the steering system 440 is configured to orient the front wheels 14B of the lift device 10. In some embodiments, the steering system 440 may be used in place of the steering systems 40, 240, 340 described above. The following description will focus mainly on the difference between the steering system 440 and the steering systems 40, 240, 340 described above.

The steering system 440 includes a rotational pinion gear 476, which may be selectively rotated using an electric motor (not shown) similar to motor 48. The rotational pinion gear 476 is engaged with a drag link 454 and configured to selectively actuate the drag link 454 axially. Specifically, teeth (not shown) of the pinion gear 476 are configured to engage teeth (not shown) on the drag link 454 to provide an axial force on the drag link 454. Linear bearings 478, which may be rigidly fixed to the bottom of the lift device 10, slidably receive the drag link 454 and are configured to retain the drag link 454 in a desired axial orientation. Each end 490, 492 may be similarly pivotally coupled to a corresponding one of the tie rods 80, 82. As such, the orientation of the front wheels 14B and the steering of the lift device 10, more broadly, can be controlled using the steering system 440 in a similar manner to that described above, with reference to the steering systems 40, 240, 340. The automotive-style rack-and-pinion type actuation of the steering system 440 used to swivel the front wheels 14B allows for the motor and pinion gear 476 to be compactly arranged at the center of the lift device 10.

Figure 13:
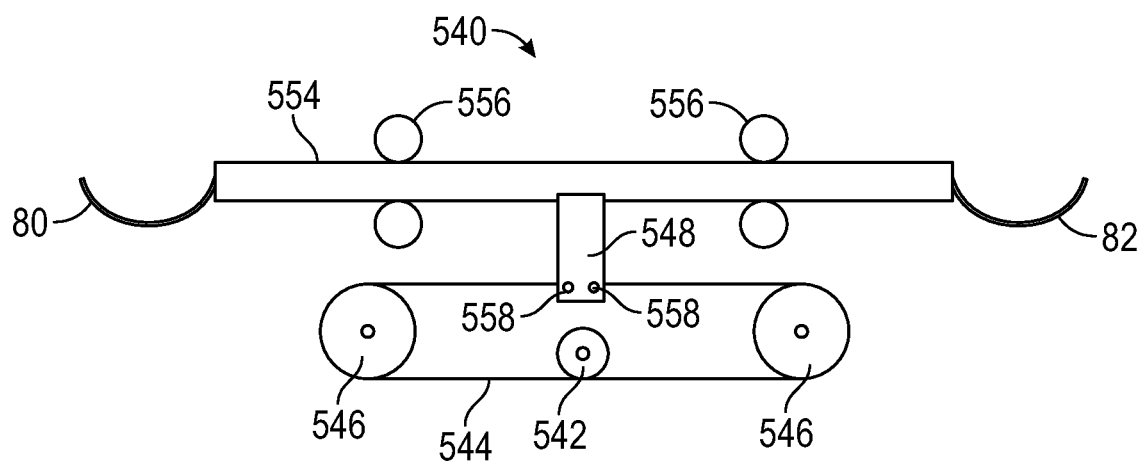
FIG. 13 is a schematic illustration of another steering system, according to an exemplary embodiment.

Referring now to FIG. 13, another exemplary embodiment of a steering system, shown as steering system 540, is depicted. Like steering systems 40, 240, 340, 440, the steering system 540 is configured to orient the front wheels 14B of the lift device 10. In some embodiments, the steering system 540 may be used in place of the steering systems 40, 240, 340, 440 described above. The following description will focus mainly on the difference between the steering system 540 and the steering systems 40, 240, 340, 440 described above.

The steering system 540 may be a chain or belt based steering system. Specifically, the steering system 540 includes a driving gear set 542, a chain or timing belt 544, a pair of sprockets or pulleys 546, a linkage 548, a drag link 554, and a plurality of bearings 556. The driving gear set 542 may be selectively rotated using an electric motor, similar to the motor 48. The driving gear set 542 is configured to engage and provide an axial force on the chain or timing belt 544. The pair of sprockets or pulleys 546 are configured to engage the chain or timing belt 544, which is wrapped around the sprockets or pulleys 546 to form a chain/timing belt loop. Ends 558 of the chain or timing belt 544 are rigidly coupled to the linkage 548. As such, actuation of the driving gear set 542 is configured to selectively move the linkage 548 axially.

The linkage 548 is rigidly fixed to the drag link 554, which is held in a constant axial orientation by the plurality of bearings 556. The plurality of bearings 556 are configured to slidable receive the drag link 554, such that the drag link 554 may be selectively actuated by the linkage 548. Accordingly, selective actuation of the driving gear set 542 is configured to selectively actuate the linkage 548, and thereby the drag link 554. Each end 590, 592 may be similarly pivotally coupled to the a corresponding one of the tie rods 80, 82. As such, the orientation of the front wheels 14B and the steering of the lift device 10, more broadly, can be controlled using the steering system 540 in a similar manner to that described above, with reference to the steering systems 40, 240, 340, 440. Once again, the configuration of the steering system 540 allows for the motor and drive gear set 542 to be arranged at the center of the lift device 10. Further, the belt-type actuation of the steering system 540 effectively isolates the motor from any transverse shock loads.

Figure 14:
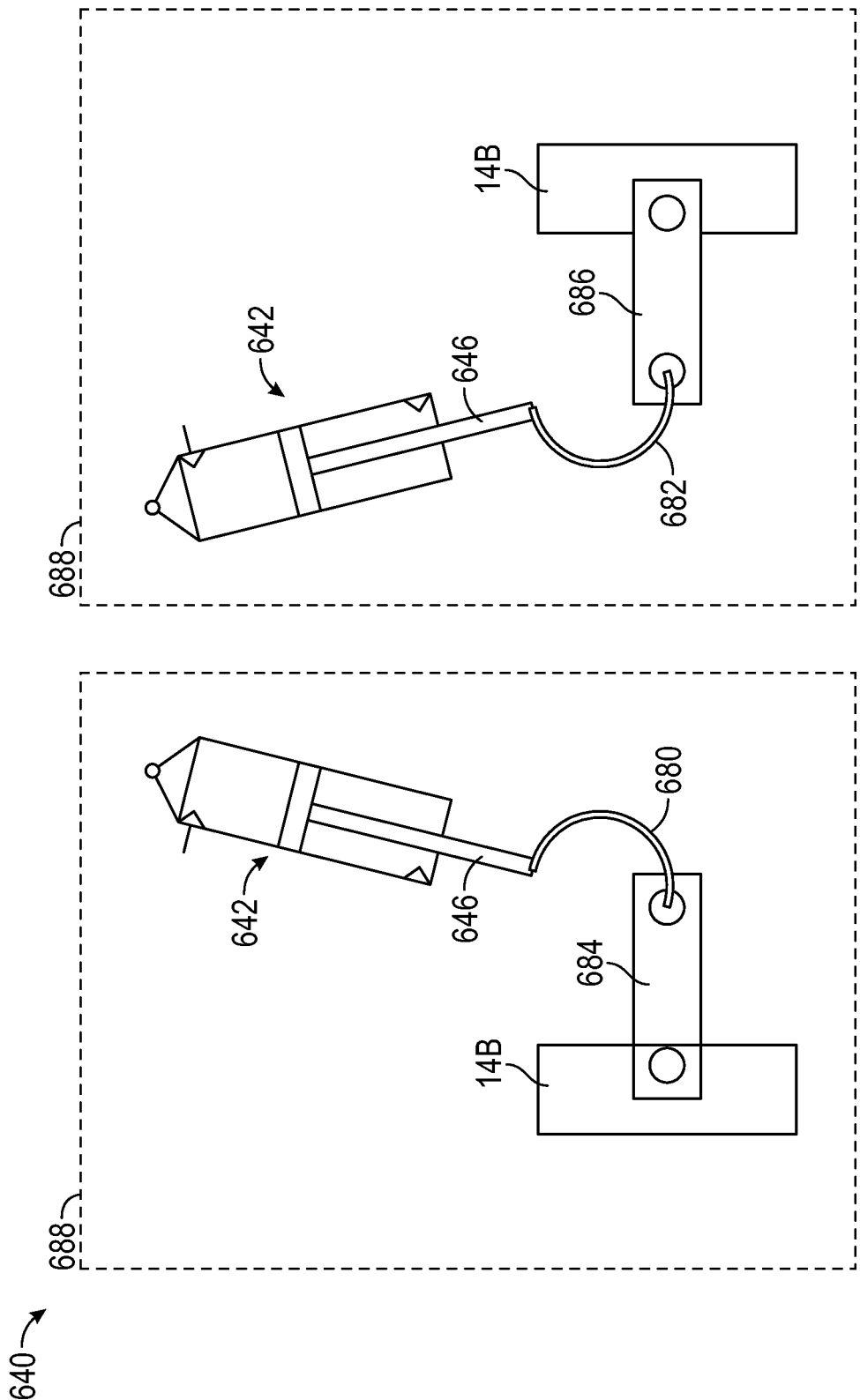
FIG. 14 is a schematic illustration of another steering system, according to an exemplary embodiment.

Referring now to FIG. 14, another exemplary embodiment of a steering system, shown as steering system 640, is depicted. Like steering systems 40, 240, 340, 440, 540, the steering system 640 is configured to orient the front wheels 14B of the lift device 10. In some embodiments, the steering system 640 may be used in place of the steering systems 40, 240, 340, 440, 540 described above. The following description will focus mainly on the difference between the steering system 640 and the steering systems 40, 240, 340, 440, 540 described above.

The steering system 640 includes a pair of linear actuators 642. Each of the linear actuators 642 may be structured substantially similar to the linear actuator 42 described above. The linear actuators 642 each include an axially-movable piston 646. A distal end of each of the pistons 646 is pivotally coupled to a corresponding tie rod 680, 682. The tie rods 680, 682 of the steering system 640 may be substantially similar to the tie rods 80, 82 described above. An opposite end of each tie rod 680, 682 may be pivotally coupled to a corresponding flange 684, 686. The flanges 684, 686 may be coupled to and configured to control the orientation of the front wheels 14B. As such, the steering system 640 effectively includes two independent steering subsystems 688 that may be collectively used to control the orientation of the orientation of the front wheels 14B and the lift device 10, more broadly. The independent nature of the steering subsystems 688 allows for the linear actuators 642 to be mounted in differing orientations on the bottom of the lift device 10. Further, the independent nature of the steering subsystems 688 may allow for a more flexible steering capability. Additionally, the pivotal connections between the linear actuators 642 and the tie rods 680, 682 in conjunction with the pivotal connections between the tie rods 680, 682 and the flanges 684, 686 may eliminate lateral forces exerted onto the piston 646. Further still, the direct mounting of the linear actuators 642 and the tie rods 680, 682 may allow for the linear actuators 642 to be run at a lower actuator speed.

Figure 15:
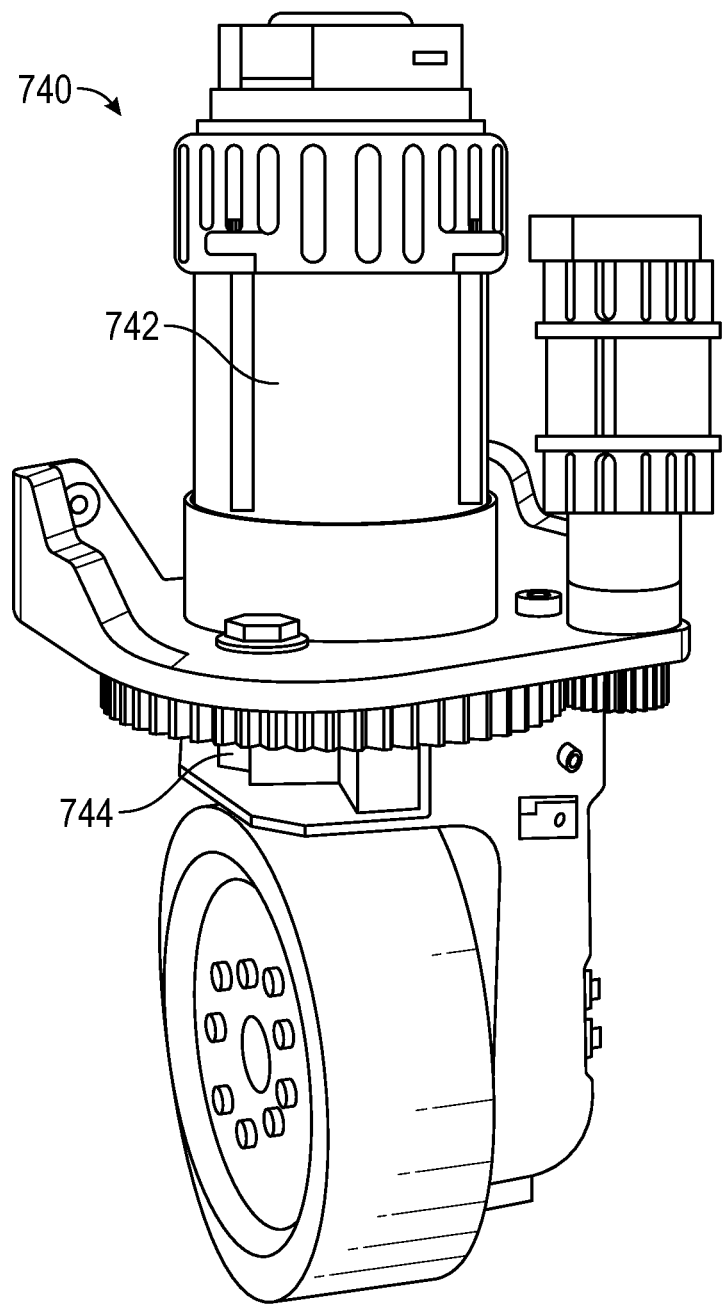
FIG. 15 is a top perspective view of another steering system, according to an exemplary embodiment.

Referring now to FIG. 15, yet another exemplary embodiment of a steering system, shown as steering system 740, is depicted. Like the steering systems 40, 240, 340, 440, 540, 640, the steering system 740 is configured to orient replacement front wheels 14B of the lift device 10. In some embodiments, the steering system 740 may be used in place of the steering systems 40, 240, 340, 440, 540, 640 described above. The following description will focus mainly on the difference between the steering system 740 and the steering systems 40, 240, 340, 440, 540, 640 described above.

The steering system 740 includes a wheel orientation motor 742 coupled to a rotatable wheel flange 744. The wheel orientation motor 742 is mountable onto the bottom of the base 12, and is configured to selectively rotate the rotatable wheel flange 744. The rotatable wheel flange 744 is configured to be rotatably coupled to a corresponding one of the front wheels 14B. In use, the lift device 10 may have a corresponding steering system 740 for each of the front wheels 14B (or the rear wheels 14A) to selectively orient the lift device 10 while driving.

It will be appreciated that various aspects of the steering systems 40, 240, 340, 440, 540, 640, 740 described above may be interchangeable. That is, in some embodiments, various aspects of the steering systems 40, 240, 340, 440, 540, 640, 740 may be implemented into any of the other steering systems 40, 240, 340, 440, 540, 640, 740.

Additionally, while the retractable lift mechanism included on lift device 10 is a scissor lift mechanism, in some instances, a vehicle may be provided that alternatively includes a retractable lift mechanism in the form of a boom lift mechanism. For example, in the exemplary embodiment depicted in FIG. 16, a vehicle, shown as vehicle 810, is illustrated. The vehicle 810 includes a retractable lift mechanism, shown as boom lift mechanism 816. The boom lift mechanism 816 is similarly formed of a series of linked, foldable support members 823. The boom lift mechanism 816 is selectively movable between a retracted or stowed position and a deployed or work position using a plurality of actuators 824. Each of the plurality of actuators 824 may be an electric actuator.

Advantageously, vehicles 10, 810 may be fully-electric lift devices. All of the electric actuators and electric motors of vehicles 10, 810 can be configured to perform their respective operations without requiring any hydraulic systems, hydraulic reservoir tanks, hydraulic fluids, engine systems, etc. That is, both vehicles 10, 810 may be completely devoid of any hydraulic systems and/or hydraulic fluids generally. Said differently, both vehicles 10, 810 may be devoid of any moving fluids. Traditional lift devices do not use a fully-electric system and require regular maintenance to ensure that the various hydraulic systems are operating properly. The vehicles 10, 810 may use electric motors and electric actuators, which allows for the absence of combustible fuels (e.g., gasoline, diesel) and/or hydraulic fluids. As such, the vehicles 10, 810 may be powered by batteries, such as battery 26, that can be re-charged when necessary.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the steering system as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A steering system, comprising:
a first wheel and a second wheel laterally spaced apart from the first wheel, wherein the first wheel and the second wheel define a travel direction, the first wheel being rotatably coupled to a first knuckle and the second wheel being rotatably coupled to a second knuckle;
a third wheel and a fourth wheel laterally spaced apart from the third wheel, wherein the third wheel and the fourth wheel are both pivotally fixed in a forward-aligned orientation,
a first tie rod having a first end pivotally coupled to the first knuckle and a second end pivotally coupled to a mechanical linkage;
a second tie rod having a first end pivotally coupled to the second knuckle and a second end pivotally coupled to the mechanical linkage, wherein the mechanical linkage includes a drag link, wherein the drag link is defined by a first end and a second end opposite the first end of the drag link, the first end of the drag link supporting a first pin coupling securing the first tie rod to the drag link, the second end of the drag link supporting a second pin coupling securing the second tie rod to the drag link; and
an electrical actuator coupled to the mechanical linkage, wherein the mechanical linkage is arranged in front of the electrical actuator relative to the travel direction, wherein the electrical actuator is a linear actuator having a housing and a motor-driven piston movable relative to the housing, the motor-driven piston being movable about a first axis, and wherein the electrical actuator is pivotally coupled to the drag link, the drag link being configured to move, in response to movement of the motor-driven piston relative to the housing, about a second axis offset from the first axis, and wherein the first axis and the second axis extend parallel to one another.

2. The steering system of claim 1, wherein movement of the electrical actuator translates the mechanical linkage axially, and wherein axial movement of the mechanical linkage pivots the first tie rod relative to the first knuckle and pivots the second tie rod relative to the second knuckle, wherein pivoting the first tie rod relative to the first knuckle adjusts a pivotal orientation of the first wheel and wherein pivoting the second tie rod relative to the second knuckle adjusts a pivotal orientation of the second wheel.

3. The steering system of claim 1, wherein the drag link is slidably received within a roller housing, the roller housing including at least one roller contacting the drag link to guide the drag link along the second axis.

4. The steering system of claim 1, wherein the first tie rod and the second tie rod are each defined by an arcuate shape.

5. The steering system of claim 1, wherein axial movement of the mechanical linkage in response to movement by the electrical actuator in a first direction transmits a tensile force through the first tie rod and transmits a compressive force through the second tie rod, the tensile force causing the first knuckle to rotate in a first rotational direction and the compressive force causing the second knuckle to rotate in the first rotational direction.

6. The steering system of claim 5, wherein axial movement of the mechanical linkage in response to movement by the electrical actuator in a second direction transmits a compressive force through the first tie rod and transmits a tensile force through the second tie rod, the compressive force through the first tie rod causing the first knuckle to rotate a second rotational direction opposite the first rotational direction and the tensile force through the second tie rod causing the second knuckle to rotate in the second rotational direction.

7. The steering system of claim 1, wherein the drag link is slidably received within linear bearings.

8. A steering system, comprising:
a first wheel and a second wheel laterally spaced apart from the first wheel, wherein the first wheel and the second wheel define a travel direction, the first wheel being rotatably coupled to a first knuckle and the second wheel being rotatably coupled to a second knuckle;
a third wheel and a fourth wheel laterally spaced apart from the third wheel, wherein the third wheel and the fourth wheel are both pivotally fixed in a forward-aligned orientation,
a first tie rod having a first end pivotally coupled to the first knuckle and a second end pivotally coupled to a mechanical linkage;
a second tie rod having a first end pivotally coupled to the second knuckle and a second end pivotally coupled to the mechanical linkage, wherein the mechanical linkage includes a drag link, wherein the drag link is defined by a first end and a second end opposite the first end of the drag link, the first end of the drag link supporting a first pin coupling securing the first tie rod to the drag link, the second end of the drag link supporting a second pin coupling securing the second tie rod to the drag link; and
an electrical actuator coupled to the mechanical linkage, wherein the mechanical linkage is arranged in front of the electrical actuator relative to the travel direction, wherein the electrical actuator is a motor supplying rotational power to a belt, the belt being coupled to a linkage that extends away from the drag link and translates the drag link axially in a first direction in response to clockwise belt rotation and translates the drag link axially in a second direction opposite the first direction in response to counterclockwise belt rotation.

* * * * *